United States Patent
Otosaka

(10) Patent No.: US 8,813,523 B2
(45) Date of Patent: Aug. 26, 2014

(54) GLASS LATHE

(75) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 272 days.

(21) Appl. No.: 13/357,619

(22) Filed: Jan. 25, 2012

(65) Prior Publication Data

US 2012/0186302 A1 Jul. 26, 2012

(30) Foreign Application Priority Data

Jan. 26, 2011 (JP) ................. 2011-013794

(51) Int. Cl.
*C03B 23/045* (2006.01)
*C03B 37/012* (2006.01)
*C03B 23/043* (2006.01)

(52) U.S. Cl.
CPC ......... *C03B 23/043* (2013.01); *C03B 37/01257* (2013.01); *C03B 37/01237* (2013.01)
USPC ........................................................ 65/507

(58) Field of Classification Search
CPC ................... C03B 37/01884; C03B 37/01486; C03B 23/045
See application file for complete search history.

(56) References Cited

U.S. PATENT DOCUMENTS

| | | | | |
|---|---|---|---|---|
| 5,318,612 A * | 6/1994 | Le Noane et al. | ............... | 65/419 |
| 2006/0016226 A1* | 1/2006 | Nakanishi et al. | ............... | 65/509 |
| 2013/0052364 A1* | 2/2013 | Hartsuiker et al. | ............ | 427/513 |

FOREIGN PATENT DOCUMENTS

| | | |
|---|---|---|
| CN | 1550870 A | 12/2004 |
| FR | 2 505 472 A1 | 11/1982 |
| JP | S61-72648 A | 4/1986 |
| JP | H03-141124 A | 6/1991 |
| JP | 2003-313040 A | 11/2003 |
| JP | 2005-231959 A | 9/2005 |
| JP | 2006-193379 A | 7/2006 |
| JP | 2009-508789 A | 3/2009 |

OTHER PUBLICATIONS

"Notice of Reasons for Rejection" issued by the Japan Patent Office for application No. 2011-013794.
EP Search Report for Application No. 12152375.7 issued on Mar. 16, 2012.
Second Office Action for counterpart Application No. 201210019189.X, issued by the State Intellectual Property Office of China on May 20, 2014.

* cited by examiner

*Primary Examiner* — Joseph S Del Sole
*Assistant Examiner* — Russell Kemmerle, III

(57) ABSTRACT

Provided is a glass lathe that processes a glass member by heating the glass member with a burner, wherein a reflector that reflects electromagnetic waves is arranged around a portion of the glass member to be heated. The reflector preferably has a spherical surface with a portion removed therefrom, and may be formed of a mirror surface finishing agent for SUS, aluminum, or an aluminum alloy. An inner surface of the reflector is preferably covered by gold, platinum, or rhodium, and an outer surface of the reflector is preferably processed to improve thermal emittance, by applying an infrared light emitting coating thereto.

9 Claims, 2 Drawing Sheets

GLASS LATHE

The contents of the following Japanese patent application are incorporated herein by reference: No. 2011-013794 filed on Jan. 26, 2011

BACKGROUND

1. Technical Field

The present invention relates to a glass lathe. In particular, the present invention relates to a glass lathe for heating and processing a glass member such as an optical fiber preform.

2. Related Art

A glass lathe is an apparatus for heating a rotating glass member such as a glass rod or glass tube with a burner flame, in order to perform processing such as welding, fusion cutting, drawing, or fire polishing. The apparatus of the present invention is used when processing an optical fiber preform, for example. An oxyhydrogen flame is usually used by a glass lathe for processing a glass member. In particular, when the glass member is quartz glass, the temperature change can reach 2000° C.

In a glass lathe, when the glass member is heated, heat is added to the glass member from the burner flame as a result of convective heat transfer. Heat is released by being emitted from the heated glass member. The amount of heat emitted by the glass member is extremely large, because the temperature of the glass member reaches close to 2000° C. The amount of heat emitted from the glass member can be calculated according to the Stefan-Boltzmann Law. When the reflectivity is 1.0 and the surrounding temperature is 20° C., the energy loss due to emission per unit area is 1.5 MW/m$^2$. For example, if the glass rod 2 is assumed to have a diameter of 80 mm and the heated region is assumed to have a length of 80 mm, the side surface area is approximately 20,000 mm$^2$, and therefore the energy loss from the side surface is approximately 30 kW. In other words, in order to maintain a temperature of 2000° C., it is necessary to constantly apply 30 kW of heat to the glass rod 2. Therefore, the necessary flow rate of hydrogen gas is approximately 400 L/min, based on experience. Since the amount of heat generated when performing the firing with 400 L/min of hydrogen is 73 kW, the thermal efficiency is calculated to be approximately 41%.

Since the processing of the glass member consumes a large amount of energy in this way, lower energy consumption is desired when considering the environmental burden and cost. Patent Document 1 discloses a method of surrounding the portion of the glass member being heated with a surrounding body made of high-purity quartz. The temperature of this surrounding body is an intermediate temperature between room temperature and the temperature of the glass member, and therefore the heat emitted from the surrounding body to the room is less than the temperature emitted directly from the glass member. Furthermore, the heat generated by the firing is more efficiently transferred to the glass member.

Patent Document 1: Japanese Translation of PCT International Application No. 2009-508789

In the method of Patent Document 1, the quartz material of the surrounding body functions only as a heat insulator and a heat storage tank. Accordingly, a large amount of heat emitted from the glass rod 2 is lost, and the heating efficiency is decreased. Furthermore, with the method of Patent Document 1, when the surrounding body is used to heat the glass member, glass evaporates from the surface of the glass member. The evaporated glass is deposited as soot on the inner surface of the surrounding body at a lower temperature, and the deposited soot falls away and becomes attached to the glass member, thereby reducing the quality of the glass member. Furthermore, if the temperature is lowered after the processing and processing is then performed again, a large amount of the glass soot deposited on the inner surface of the surrounding body falls away and sticks to the glass rod. In order to avoid this problem, a cooling and cleaning process must be performed before the subsequent processing, and this lowers the capacity utilization rate.

In consideration of the above problems, it is an object of the present invention to provide a glass lathe that can increase heating efficiency when heating a glass member using a burner flame. The glass lathe preferably restricts the glass member from being contaminated with soot or the like.

SUMMARY

Therefore, it is an object of an aspect of the innovations herein to provide a glass lathe, which is capable of overcoming the above drawbacks accompanying the related art. The above and other objects can be achieved by combinations described in the independent claims. The dependent claims define further advantageous and exemplary combinations of the innovations herein. According to a first aspect related to the innovations herein, provided is a glass lathe that processes a glass member by heating the glass member with a burner, wherein a reflector that reflects electromagnetic waves is arranged around a portion of the glass member to be heated.

According to a second aspect related to the innovations herein, the reflector preferably has a spherical surface with a portion removed therefrom. A mirror surface finishing agent for metal is preferably used as material for the reflector. The metal used for the reflector can be SUS, aluminum, or an aluminum alloy.

According to a third aspect related to the innovations herein, an inner surface of the reflector is preferably covered by gold, platinum, or rhodium, and an outer surface of the reflector is preferably processed to improve thermal emittance, by applying an infrared light emitting coating thereto, for example.

The summary clause does not necessarily describe all necessary features of the embodiments of the present invention. The present invention may also be a sub-combination of the features described above.

BRIEF DESCRIPTION OF THE DRAWINGS

FIG. 1A is a cross section over the line I-I shown in FIG. 1B.

DESCRIPTION OF EXEMPLARY EMBODIMENTS

Hereinafter, embodiments of the present invention will be described. The embodiments do not limit the invention according to the claims, and all the combinations of the features described in the embodiments are not necessarily essential to means provided by aspects of the invention.

Figure 1A:
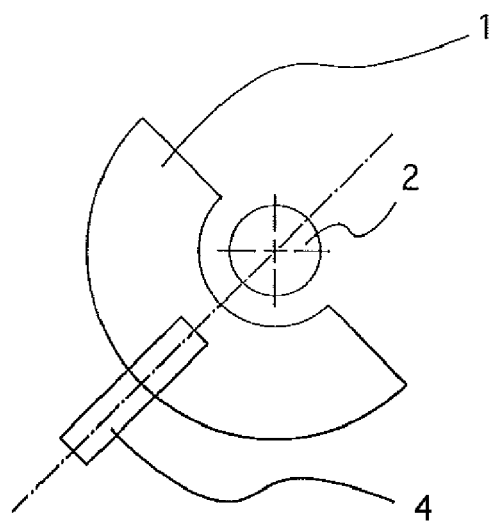
FIGS. 1A and 1B are schematic views for describing essential elements of the glass lathe of the present invention.
Figure 1B:
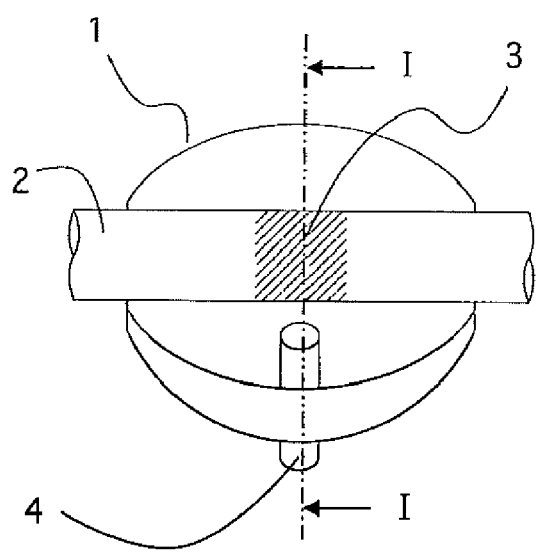

FIGS. 1A and 1B show essential portions of a glass lathe according to the present invention. A glass rod (glass member) 2 that rotates according to a rotating mechanism, not shown, is heated by a burner 4, to form a heated region 3 shown by the diagonal line pattern. A reflector 1 is arranged around the periphery of the heated region 3 of the glass rod 2.

Electromagnetic waves, such as infrared light and visible light, emitted from the heated region 3 of the glass rod 2 are reflected by the reflector 1 and reabsorbed by the glass rod 2, thereby decreasing thermal loss due to the emission of electromagnetic waves from the glass rod 2.

As shown in FIG. 1, the reflector 1 preferably has a spherical surface from which a portion is removed. By substantially matching the center of the reflector 1 with the rotational axis core of the heated region 3 of the glass rod 2, the infrared light and visible light emitted from the heated region 3 of the glass rod 2 is reflected in the opposite direction by the surface of the reflector 1 and returned to the heated region 3 of the glass rod 2. The center of the reflector 1 refers to the center of the spherical surface prior to a portion of the reflector 1 being removed.

The reflector 1 may be arranged anywhere that is not above the glass rod 2 being processed, such as below the glass rod 2. Since the reflector 1 is not above the glass rod 2, the soot glass evaporated from the glass rod 2 is unlikely to be deposited on the reflector 1, and even if soot glass is deposited on the reflector 1, the soot glass falls away and does not contaminate the glass rod 2.

The reflector 1 is preferably shaped to have a portion thereof opposite the burner 4 removed. The convection caused by the burner 4 flows in a direction opposite that of the burner 4. When the soot glass evaporated from the glass rod 2 is carried by the convection, contamination of the reflector 1 decreases because the reflector 1 is not present in the direction opposite the burner 4.

In FIG. 1, the burner 4 penetrates through the center of the surface of the reflector 1. However, since the glass rod 2 rotates, it is not absolutely necessary to align the burner 4 with the center of the reflector 1.

Generally, the material of the reflector 1 is preferably a metal mirror surface finishing agent that has high reflectivity with respect to infrared light and visible light. This metal may be SUS, aluminum, or an aluminum alloy. SUS has reflectivity of approximately 50% to 60%, which is not very high, but is solid and easy to handle. Aluminum or an aluminum alloy has a low melting point and is easily oxidized, and so there are cases where a forced cooling means such as cold water is necessary, but also has the benefits of having relatively high reflectivity of approximately 90%, being effective for improving thermal efficiency, and being inexpensive. Furthermore, applying a mirror surface finish can restrict scattered reflection and efficiently return the received emitted heat to the glass member.

It is also effective to form the body of the reflector 1 of a solid material such as SUS and then cover the inner surface thereof with a material having high corrosion resistance and high reflectivity. The material used for the covering may be gold, platinum, or rhodium, for example. Such materials are noble metals with excellent corrosion resistance and reflectivity, but are also expensive, and therefore using a covering technique such as coating is less expensive than forming the base material from a noble metal.

Since the reflector 1 is exposed to high temperatures, there can be changes in the surface that cause a decrease in the reflectivity. Due to using a material with high reflectivity, the reflector 1 has low thermal emittance and has trouble dispelling heat. In such a case, the outer surface of the reflector 1 can be processed to improve the thermal emittance, thereby encouraging the emission of heat from the reflector 1 and decreasing the amount of the temperature increase in the reflector 1.

In the reflector 1, the reflectivity of the material of the inner surface is preferably higher than the reflectivity of the material of the outer surface. Furthermore, the thermal emittance of the material of the inner surface of the reflector 1 is preferably less than the thermal emittance of the material of the outer surface. Therefore, heat emittance from the reflector 1 can be encouraged and the increase in temperature of the reflector 1 can be decreased, without decreasing the reflectivity of the inner surface of the reflector 1.

The means for improving the thermal emittance of the outer surface of the reflector 1 may be a method that involves application of an infrared light emitting coating to the outer surface of the reflector 1 by applying B-600 manufactured by Okitsumo Inc., B-KS-900 manufactured by Ceramic Coating Inc., or a black body spray manufactured by Shin-Etsu Chemical Co., Ltd., thereby decreasing the temperature of the reflector 1. The following provides a detailed description of first to fifth embodiments and a first comparative example relating to the glass lathe of the present invention, but the present invention is not limited to these embodiments.

Embodiments

First Comparative Example

A quartz glass rod 2 with a diameter of 95 mm was disposed in a glass lathe, and drawn with a tensile force of 200 kgf while being heated in an oxygen flame having a hydrogen flow rate of 500 L/min and an oxygen flow rate of 250 L/min. The time needed to reach a 30 mm extension was measured to be 1360 seconds.

First Embodiment

As shown in FIG. 1, a semi-spherical reflector 1 with a diameter of 300 mm and a polished inner surface made of SUS 304 was positioned below the quartz glass rod 2 in the glass lathe such that the spherical center of the reflector 1 substantially matches the center of the rotational axis of a quartz glass rod 2. The quartz glass rod 2 with a diameter of 95 mm was disposed in the glass lathe, and drawn with a tensile force of 200 kgf while being heated in an oxygen flame having a hydrogen flow rate of 500 L/min and an oxygen flow rate of 250 L/min. The time needed to reach a 30 mm extension was measured to be 765 seconds, thereby decreasing the time and amount of gas needed by 43.8% compared to the first comparative example. The outer surface temperature of the reflector 1 at this time was 683° C. The surface of the reflector 1 after processing was clean without soot stuck thereto, and could therefore be reused as is. It should be noted that deformation was observed in the surface of the reflector 1 due to the firing.

Second Embodiment

A semi-spherical reflector 1 with a diameter of 300 mm and an inner surface made of SUS 304 and coated with metal was provided for the glass lathe, and all other conditions were the same as in the first embodiment. A quartz glass rod 2 with a diameter of 95 mm was disposed in the reflector 1 and drawn. The time needed to reach a 30 mm extension was measured to be 620 seconds, thereby decreasing the time and amount of gas needed by 54.4% compared to the first comparative example. The outer surface temperature of the reflector 1 at this time was 500° C. The surface of the reflector 1 after processing was clean without soot stuck thereto, and could therefore be reused as is. It should be noted that a portion of the metal plating was vaporized, and so there were locations where the SUS 304 base material was exposed.

Third Embodiment

A semi-spherical reflector 1 with a diameter of 300 mm, an inner surface made of SUS 304 and coated with metal, and an outer surface with an infrared light emitting coating applied thereto was provided for the glass lathe, and all other conditions were the same as in the first embodiment. A quartz glass rod 2 with a diameter of 95 mm was disposed in the reflector 1 and drawn. The time needed to reach a 30 mm extension was measured to be 630 seconds, thereby decreasing the time and amount of gas needed by 53.7% compared to the first comparative example. The outer surface temperature of the reflector 1 at this time was 380° C., which is significantly lower than in the first embodiment. The surface of the reflector 1 after processing was clean without soot stuck thereto, and could therefore be reused as is.

Fourth Embodiment

A semi-spherical reflector 1 with a diameter of 500 mm and a polished inner surface made of aluminum was provided for the glass lathe, and all other conditions were the same as in the first embodiment. A quartz glass rod 2 with a diameter of 95 mm was disposed in the reflector 1 and drawn. The time needed to reach a 30 mm extension was measured to be 645 seconds, thereby decreasing the time and amount of gas needed by 52.6% compared to the first comparative example. The outer surface temperature of the reflector 1 at this time was 470° C. The surface of the reflector 1 after processing was clean without soot stuck thereto, and could therefore be reused as is. It should be noted that a portion of the surface was oxidized, resulting in whitening.

Fifth Embodiment

A semi-spherical reflector 1 with a diameter of 300 mm, a polished inner surface made of aluminum, and an outer surface with infrared light applied thereto was provided for the glass lathe, and all other conditions were the same as in the first embodiment. A quartz glass rod 2 with a diameter of 95 mm was disposed in the reflector 1 and drawn. The time needed to reach a 30 mm extension was measured to be 645 seconds, thereby decreasing the time and amount of gas needed by 52.6% compared to the first comparative example. The outer surface temperature of the reflector 1 at this time was 430° C. The surface of the reflector 1 after processing was not deformed and was clean without soot stuck thereto, and could therefore be reused as is.

Figure 2:
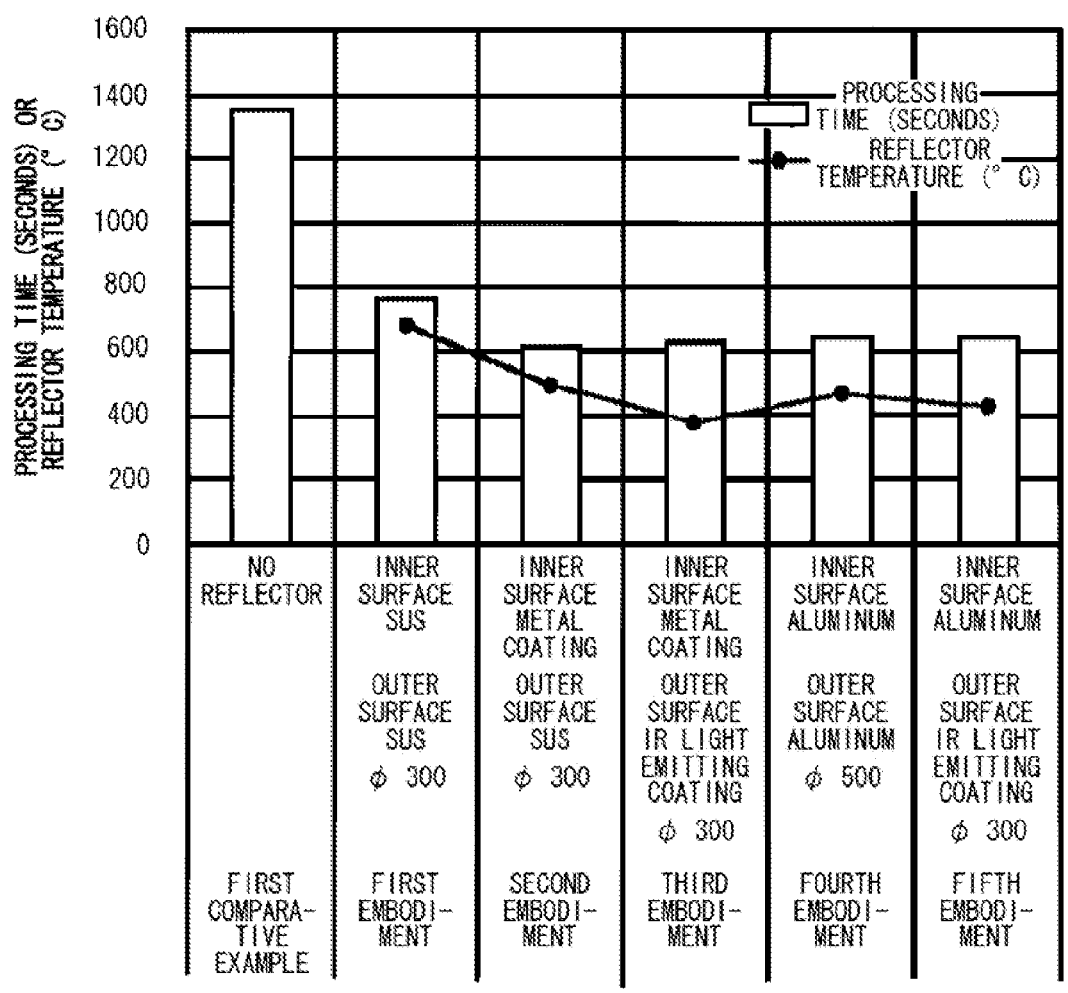
FIG. 2 is a graph showing processing time and reflector temperature for each embodiment and a comparative example.

The results described above are shown together in FIG. 2. The semi-spherical reflector 1 arranged below the quartz glass rod 2 is provided for the glass lathe. As a result, the heat emitted from the heated region 3 is reflected by the reflector 1 and returned to the glass rod 2, and therefore the time needed to draw and extend the quartz glass rod 2 is approximately half of the time needed in the first comparative example that does not include the reflector 1. Furthermore, the amount of gas used for the firing is reduced by approximately half, and therefore the amount of heat emitted outside of the apparatus is greatly reduced. Yet further, since the reflector 1 is arranged below the glass rod 2, evaporated soot glass that is deposited on the reflector 1 falls away without contaminating the glass rod 2.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, the embodiments of the present invention can be used to realize a glass lathe that can improve heating efficiency when thermally processing a glass member using a burner flame, without contaminating the glass member with soot or the like.

What is claimed is:

1. A glass lathe that processes a glass member by heating the glass member with a burner, the glass lathe comprising:
   a reflector, arranged around a portion of the glass member to be heated, that reflects electromagnetic waves, wherein
   a coating for improving thermal emittance is applied to an outer surface of the reflector.

2. The glass lathe according to claim 1, wherein the reflector has a spherical surface with a portion removed therefrom.

3. The glass lathe according to claim 2, wherein a portion of the reflector facing the burner is removed.

4. The glass lathe according to claim 1, wherein the reflector is made of metal with a mirror surface finish applied thereto.

5. The glass lathe according to claim 4, wherein the metal is SUS, aluminum, or an aluminum alloy.

6. The glass lathe according to claim 1, wherein an inner surface of the reflector is covered by gold, platinum, or rhodium.

7. The glass lathe according to claim 1, wherein an infrared light emitting coating is used as a means for improving the thermal emittance.

8. The glass lathe according to claim 1, wherein a rotational axis core of a heated region of the glass rod is positioned at a center of the reflector.

9. The glass lathe according to claim 1, wherein reflectivity of material forming an inner surface of the reflector is greater than reflectivity of material forming an outer surface of the reflector, and thermal emittance of the material forming the inner surface of the reflector is less than thermal emittance of the material forming the outer surface of the reflector.

* * * * *